April 9, 1963 M. F. MAY 3,084,669
LIVESTOCK CHUTE GATE
Filed Feb. 26, 1960 2 Sheets-Sheet 1

Inventor:
Maxwell F. May,
By Holman, Brady, Wegner,
Allen, & Stellman, Attys.

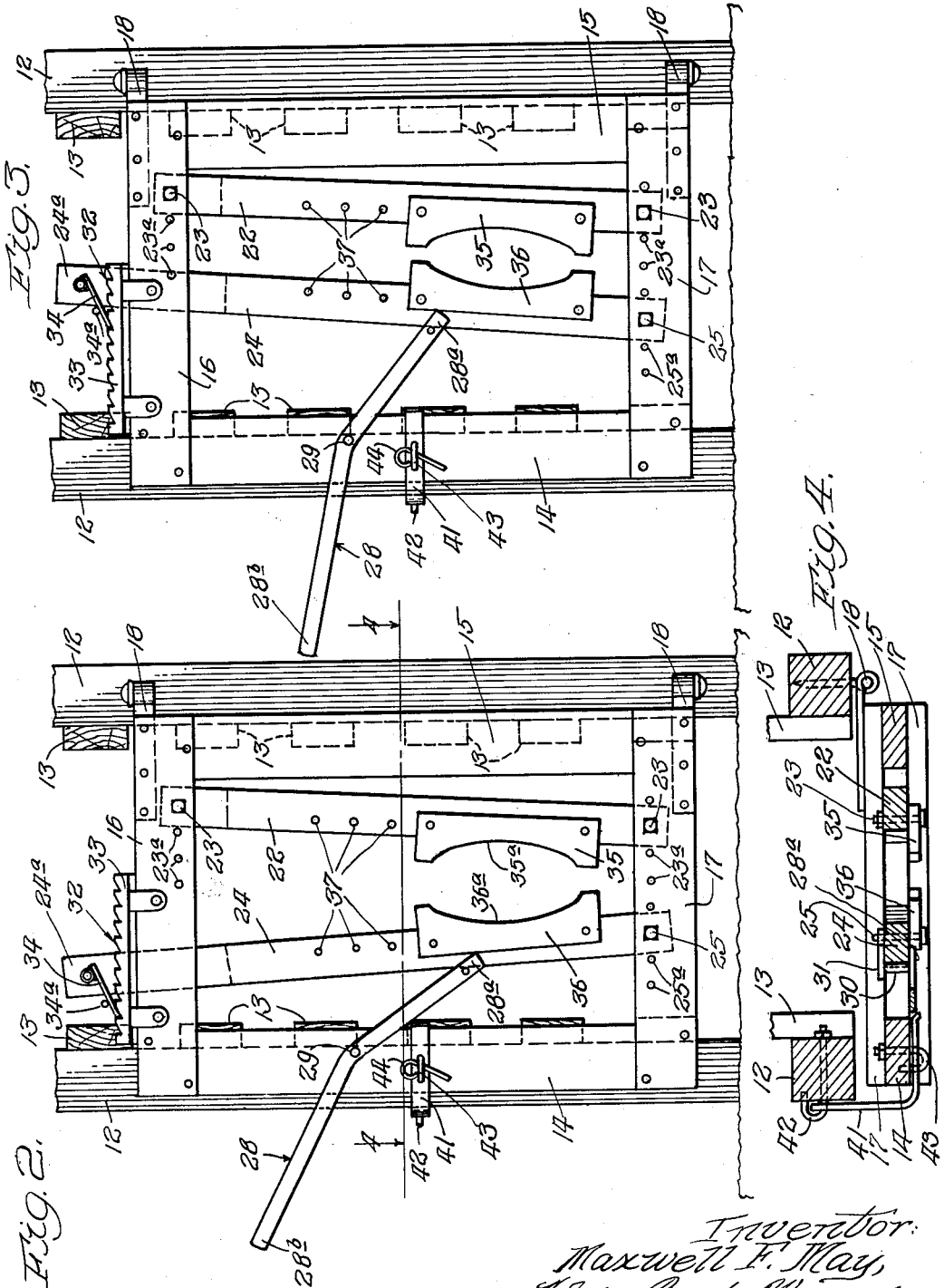

United States Patent Office 3,084,669
Patented Apr. 9, 1963

3,084,669
LIVESTOCK CHUTE GATE
Maxwell F. May, Baring, Mo.
Filed Feb. 26, 1960, Ser. No. 11,250
8 Claims. (Cl. 119—98)

This invention is concerned with a stock holding arrangement particularly for the gate of a stock chute.

Frequently, livestock must be held or confined so that they may be inspected or treated. For some purposes, it is sufficient merely to confine the animal in a stock chute or the like for simple treatment, as inoculation, but the animal must be physically restrained as by securely tying it, for more extensive treatment.

The present invention relates to a restraining structure which is particularly designed for incorporation in the gate of a stock chute and which is readily adaptable for use with various types of animals as cattle, calves and swine, to facilitate treatment thereof.

One feature of the invention is a stock holding structure having an upper frame member, a lower frame member, a first upright member extending between the frame members, a second upright member pivoted to one of the frame members, a pressure member associated with the second member for forcing it toward the first and against an animal's neck, and a latch for securing the second upright member in a desired position. Another feature is that the pressure member is a lever arm pivotally mounted on a side member of the frame and having an end portion bearing against the pivoted upright member. A further feature is that the latch includes a toothed plate carried on the top surface of the upper frame member and a ratchet plate pivoted on the second member above the plate and having an edge surface engaged with the teeth thereof.

Another feature is the provision of a pair of plates with animal neck conforming surfaces securable to the upright members at a plurality of points along the length thereof.

And another feature is that the stock holding structure is incorporated in a gate at the end of a stock chute.

Further features and advantages of the invention will readily be apparent from the following specification and from the drawings, in which:

FIGURE 2 is an elevation of the gate with the upright members in separated position;

FIGURE 3 is a view similar to FIGURE 2 with the upright members in closed position; and FIGURE 4 is a section taken generally along line 4—4 of FIGURE 2.

Figure 1:
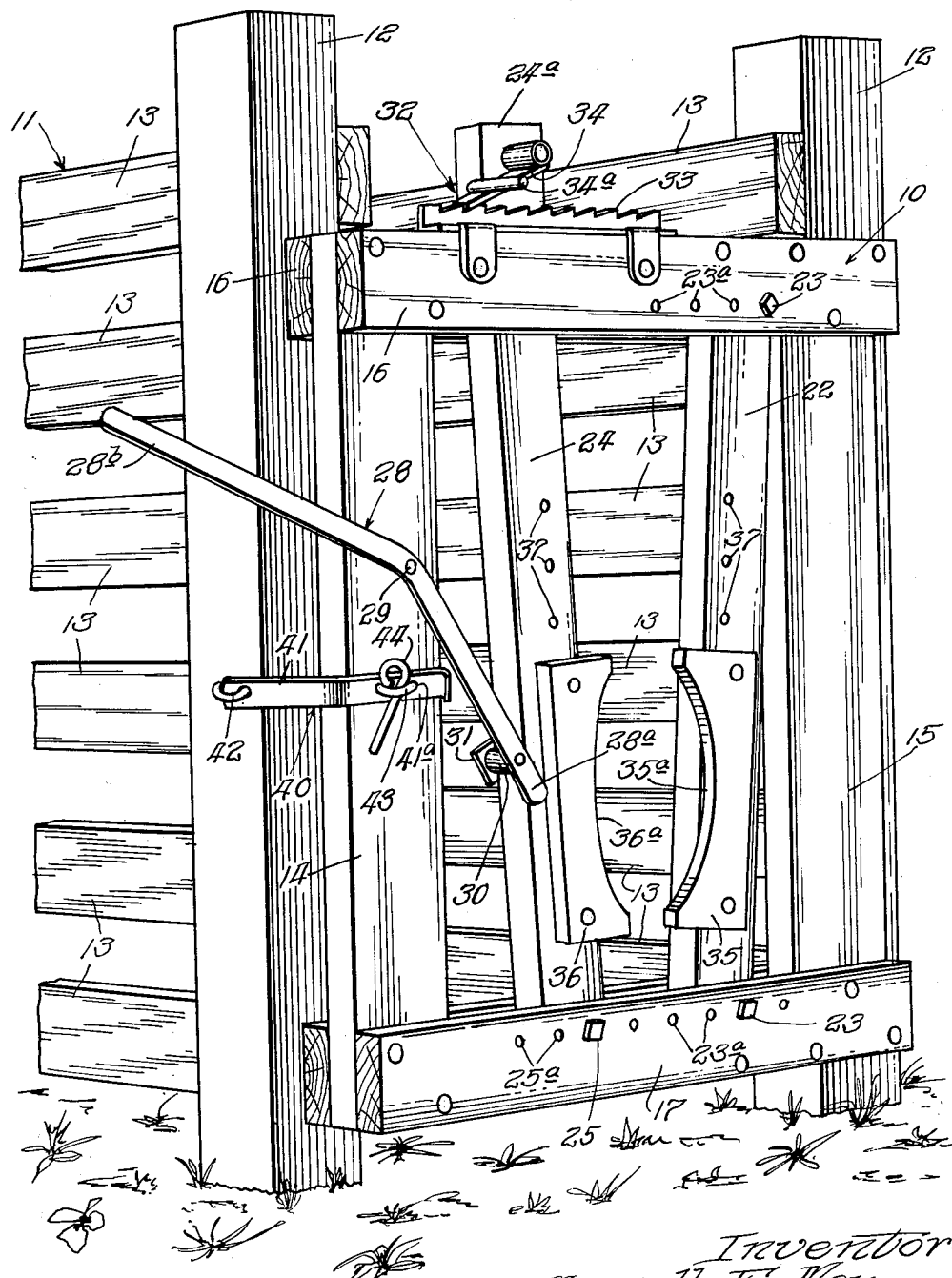
FIGURE 1 is a perspective of a stock chute with a gate embodying the invention.

In the usual stock chute, the animal is merely crowded into a corner or against an end gate for treatment and is free to move its head, neck and legs, making certain treatments extremely difficult unless further restraint is provided. When an animal's head and neck are restrained it has much less freedom of movement of its legs although they are not all positively confined.

In the embodiment of the invention illustrated in the drawings, the novel restraining structure is incorporated in the gate 10 of a stock chute 11. The stock chute includes upright end posts 12 to which are secured horizontal members 13 forming the sides of the chute. The gate 10 has a frame having vertical side members 14 and 15 joined by upper and lower members 16 and 17, preferably comprising two pieces, one on either side of the vertical frame members. The frame of the gate is preferably of wooden timbers, as 2 x 6's, which are securely bolted together at the corners. The gate is carried on one of the upright posts 12 by a pair of hinges 18.

A fixed upright member 22 extends between the upper and lower frame members between the two portions or pieces of each and secured in position as by bolts 23. A second upright member 24 is pivotally secured between the two lower frame elements 17 by a bolt 25 and has an upper end 24a which extends above the upper frame member 16. The pivotal mounting of upright member 24 permits it to be moved toward and away from upright member 22.

The position and angle of upright member 22 may be adjusted by inserting bolts through the proper pair of openings 23a provided in the upper and lower frame members 16 and 17, and the position of upright member 24 is similarly adjustable by placing the bolt 25 in the proper hole 25a.

An operating element or closing lever 28 is pivotally secured at 29 to frame the member 14 which is adjacent upright member 24 and has an end portion 28a on which is mounted tubular section 30 that bears against the edge of the upright member. Lever end 28a and a plate 31 carried on tubular bearing piece 30 embrace the sides of upright member 24 aligning the closing lever for proper operation. The end 28b of the closing lever extends outwardly for manipulation by the operator.

Upright member 24 is held in a desired position by a latch mechanism 32 including a toothed plate 33 carried on the top of upper frame member 16 and a ratchet plate 34 pivotally mounted on the upper end 24a of upright member 24. The teeth on plate 23 have a substantially vertical surface which faces the right as viewed in the drawings and against which the end of ratchet plate 34 lodges, preventing movement of the upright member 24 to the left, but riding over the surface of the teeth as the upright member is moved to the right.

In operation, the animal moves through the chute and thrusts its head and neck through the space between upright members 22 and 24, with its shoulders against the rear surface of the upright members. The operator pulls the end 28b of the closing lever downwardly forcing upright member 24 against the animal's neck, holding it securely in place. Ratchet 34 rides over the teeth of latch plate 33 and locks the member in the desired position. When the treatment is completed, the latch is released by raising the ratchet plate 34 releasing upright member 24. A pin 34a extends outwardly from ratchet 34 and may be struck with a suitable instrument to release the latch.

The utility of the restraining structure is increased by the provision of adjustable plates 35 and 36 secured to upright members 22 and 24, respectively. The plates have curved surfaces 35a and 36a which are shaped to conform generally with the configuration of the neck of an animal and confront each other so that the animal's neck is restrained between them. Plates 35 and 36 are suitably secured to upright members 22 and 24 as by bolts, and the upright members are provided with a plurality of openings therein so that the position of plates 35 and 36 may be adjusted to accommodate the height of various animals. The plates permit the use of apparatus in treatment of swine, whose necks are large and heads small, calves and the like which require the additional restraining action of the curved surfaces 35a and 36a to hold them properly.

Gate 10 is held closed by a hasp assembly 40 particularly designed for easy operation, further facilitating the rapid handling of animals. A hasp plate 41 is loosely carried on a U-bolt 42 secured to post 12 and has a slot 41a therein which is engageable with a second U-bolt 43 in gate frame member 14. A pin 44 dropped through the U-bolt 43 holds the hasp closed.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a stock holding structure: a frame having upper, lower and side members; a first upright member extending between said frame members, a second upright member extending between said frame members and pivoted to the lower frame member; a closing lever pivoted at an intermediate point to and manually operable adjacent the side frame member adjacent said second upright member, the closing lever slidably engaging the adjacent side of said second upright member and operable to force the second upright member toward the first upright member and against an animal's neck; and a latch separate from said closing lever and carried by said frame and manually operable adjacent the last said side frame member for releasably securing said second upright member in a desired position.

2. In a stock holding structure: an upper frame member; a lower frame member; a first upright member extending between said frame members; a second upright member extending between said frame members and pivoted to one of them; a pair of members with animal neck conforming surfaces on said upright members and selectively secured at any of a plurality of points along the length thereof; a closing lever slidably engaging the adjacent side of said second member, operable to pivot the second member toward the first member and against an animal's neck; and a latch separate from said closing lever for securing said second upright member in a desired position.

3. The stock holding structure of claim 2, wherein said upright members are elongated and have a plurality of vertically spaced mounting holes therethrough, said pair of members with curved animal neck conforming surfaces have mounting holes, and bolts are received in the mounting holes of the last said members and are selectively received in the mounting holes of said upright members for adjustably securing said members with curved animal neck conforming surfaces to said upright members.

4. In a stock holding structure for holding an animal by the neck: a frame having opposite side members and upper and lower frame members; a first upright member attached to said upper and lower frame members; a second upright member spaced from said first upright member and pivotally attached to said lower frame member, said upright members each having curved animal's neck-conforming surfaces; a closing lever pivoted to one of said side members and slidably engaging the adjacent side of said second upright member to force said second upright member toward said first upright member for clamping said animal's neck between said curved surfaces; a manually releasable latch separate from said closing lever and having cooperating portions on said frame and on said second upright member for releasably retaining said second upright member in a desired pivoted position with said curved surfaces clamped against an animal's neck; and manual operating portions on said closing lever and said latch adjacent each other and manually operable from a common location.

5. In a stock holding structure for holding an animal by the neck: a frame having opposite sides members and upper and lower frame members; a first upright member selectively attached adjacent one of said side members to said upper and lower frame members at any of a plurality of horizontally spaced points along said frame members; second upright member spaced from said first upright member and pivotally and selectively attached adjacent said other side member to said lower frame member at any one of a plurality of horizontally spaced points along said lower frame member; said upright members each having a plurality of vertically spaced mounting holes; a pair of plates having curved animal's neck conforming surfaces and mounting holes; bolts received in said plate mounting holes and selectively received in said upright member mounting holes for adjustably securing said plates to said upright members in spaced relationship with said curved surfaces confronting each other to accommodate the height of an animal; a closing lever pivotally mounted on said other side member and operatively releasably associated with said second upright member to force said second upright member toward said first upright member for clamping said animal's neck between said curved surfaces; a manually releasable latch separate from said closing lever and having cooperating portions including a toothed plate on said upper frame member at said other side member and a latch plate pivoted on said second upright member and releasably interlocked with said toothed plate for releasably retaining said second upright member in a desired pivoted position with said curved surfaces clamped against an animal's neck; and manual operating portions on said closing lever and said latch adjacent each other and manually operable from a common location.

6. A stock handling structure for holding an animal by the neck, comprising: an elongated stock chute having opposite sides for the passage of an animal through said chute; a stock holding gate normally closing said chute and having a frame including upper and lower frame members; a hinge connection between said gate frame and one of said chute sides for swinging said gate between a closed position across said chute and an open position; means operatively associated with said gate frame and the other of said chute sides for releasably retaining said gate in said closed position; a first upright member attached to said upper and lower frame members; a second upright member spaced from said first upright and pivotally attached to said lower frame member; said upright members each having a plurality of vertically spaced mounting holes; a pair of plates having curved animal's neck conforming surfaces and mounting holes; bolts received in said plate mounting holes and selectively received in said upright member mounting holes for adjustably securing said plates to said upright members with said curved surfaces confronting each other; a closing lever mounted on said frame and operatively associated with said second upright member to force said second upright member toward said first upright member for clamping said animal's neck between said curved surfaces; a manually releasable latch separate from said closing lever and having cooperating portions on said frame and on said second upright member for releasably retaining said second upright member in a desired pivoted position with said curved surfaces clamped against an animal's neck; and manual operating portions on said closing lever and said latch adjacent each other and manually operable from a common location.

7. A stock handling structure for holding an animal by the neck, comprising: an elongated stock chute having opposite sides and an end for the passage of an animal through said chute and out said end; a stock holding gate normally closing said chute end and having a rigid frame including opposite side members and upper and lower frame members; a hinge connection between one of said gate side members and one of said chute sides at said chute end for swinging said gate between a closed position across said chute end and an open position; means operatively associated with the other of said gate side members and the other of said chute sides for releasably retaining said gate in said closed position; a first upright member selectively attached adjacent said one side member to said upper and lower frame members at any of a plurality of horizontally spaced points along said frame members; a second upright member spaced from said first upright member and pivotally and selectively attached adjacent said other side member to said lower frame member at any one of a plurality of horizontally spaced points along said lower frame members; said upright members each having a plurality of vertically spaced mounting holes; a pair of plates having curved animal's neck conforming surfaces and mounting holes; bolts received in said plate mounting holes and selectively received in said upright member mounting holes for adjustably securing said plates to said upright members in spaced relationship with said curved surfaces confronting each other to accommodate the height of said animal; a closing lever pivotally mounted at an intermediate point on said other gate side member and operatively and releasably associated with said second upright member to force said second upright member toward said first upright member for clamping said animal's neck between said curved surfaces; a manually releasable latch separate from said closing lever and having cooperating portions including a toothed plate on said upper frame member at said other side member and a latch plate pivoted on said second upright member releasably interlocked with said toothed plate for releasably retaining said second upright member in a desired pivoted position with said curved surfaces clamped against an animal's neck; and manual operating portions on said closing lever and said latch adjacent each other and manually operable from a common location.

8. In a stock holding structure for holding an animal by the neck: an upper frame member; a lower frame member; a first upright member extending between said frame members; a second upright member extending between said frame members and pivoted to one of them, said upright members each having a plurality of vertically spaced mounting holes; a pair of plates having curved animal neck conforming surfaces and mounting holes; bolts received in said plate mounting holes and selectively received in said upright member mounting holes for adjustably securing said plates to said upright members in spaced relationship with said curved surfaces confronting each other to accommodate the height of said animal; a closing lever operably associated with said second member, operable to force said second member toward said first member for clamping said animal neck between said surfaces; and a latch for securing said second upright member in a desired position.

References Cited in the file of this patent
UNITED STATES PATENTS

| | | |
|---|---|---|
| 163,603 | Ogborn | May 25, 1875 |
| 497,163 | Boman | May 9, 1893 |
| 630,131 | Tarr | Aug. 1, 1899 |
| 791,219 | Schwartz | May 30, 1905 |
| 902,998 | Phillips | Nov. 3, 1908 |
| 1,114,094 | Apple | Oct. 20, 1914 |
| 1,517,573 | Momyer | Dec. 2, 1924 |
| 2,587,160 | Howe | Feb. 26, 1952 |
| 2,732,827 | Grell | Jan. 31, 1956 |